United States Patent [19]

Rosenthal

[11] 4,402,631
[45] Sep. 6, 1983

[54] SUBSURFACE IRRIGATION

[76] Inventor: Yuval Rosenthal, 3328 Jodee Dr., West Covina, Calif. 91791

[21] Appl. No.: 206,635

[22] Filed: Nov. 13, 1980

[51] Int. Cl.³ ............................................. E02B 11/00
[52] U.S. Cl. ...................................... 405/48; 405/43; 405/36; 239/242
[58] Field of Search ............... 405/36, 48, 43, 42; 239/542, 541, 543, 548

[56] References Cited

U.S. PATENT DOCUMENTS

| 953,080 | 3/1910 | Wriggins | 405/48 |
| 1,058,582 | 4/1913 | Harris | 405/48 |
| 1,350,229 | 8/1920 | Lee | 405/48 |
| 2,536,196 | 1/1951 | MacLeod | 405/43 |
| 2,563,300 | 8/1951 | Aker | 405/39 |
| 3,080,124 | 3/1963 | Rathmann | 405/48 X |
| 3,292,378 | 12/1966 | Rosenthal et al. | 405/48 |
| 3,333,422 | 8/1967 | Neyland | 405/48 |
| 3,779,468 | 12/1973 | Spencer | 239/542 |
| 3,966,233 | 6/1976 | Diggs | 405/48 |
| 4,247,051 | 1/1981 | Allport | 239/542 |

Primary Examiner—Dennis L. Taylor
Attorney, Agent, or Firm—Beehler, Pavitt, Siegemund, Jagger & Martella

[57] ABSTRACT

A subsoil irrigation system comprising a flexible conduit with a longitudinal row of spaced outlet nozzles passing through the conduit and exteriorly protected by a flat having an edge secured to the conduit, a free edge with a bead, and wherein the conduit is formed on a slight curve so that when it is straightened in position underground the free edge of the flat will lie in intimate contact with the conduit to prevent the intrusion of foreign particulate matter in the nozzles.

1 Claim, 4 Drawing Figures

U.S. Patent  Sep. 6, 1983  4,402,631
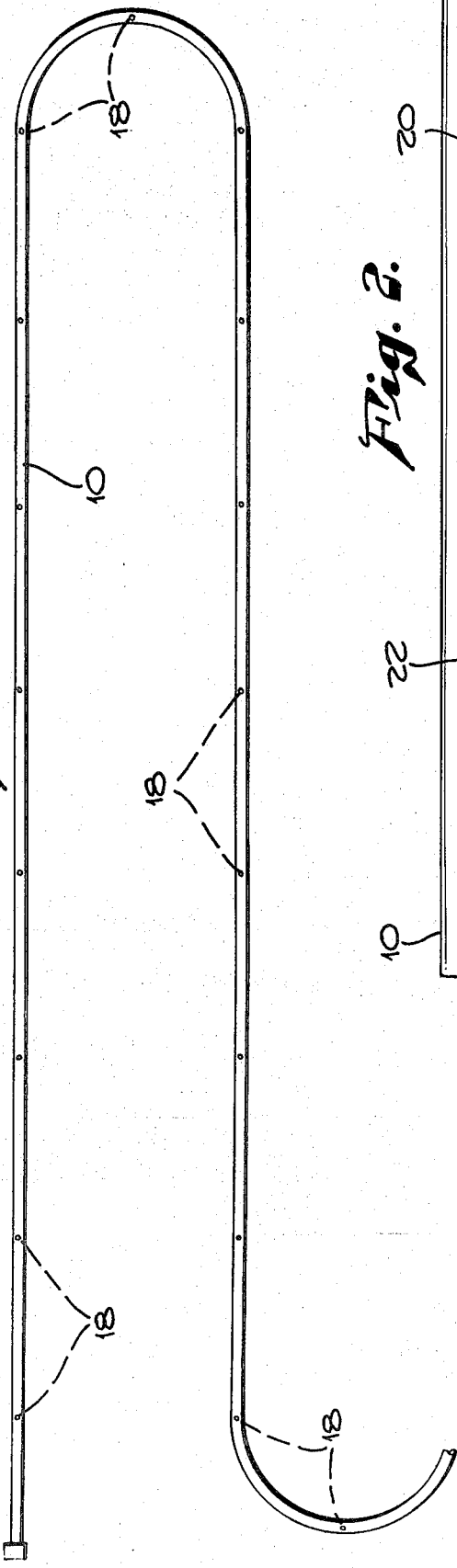
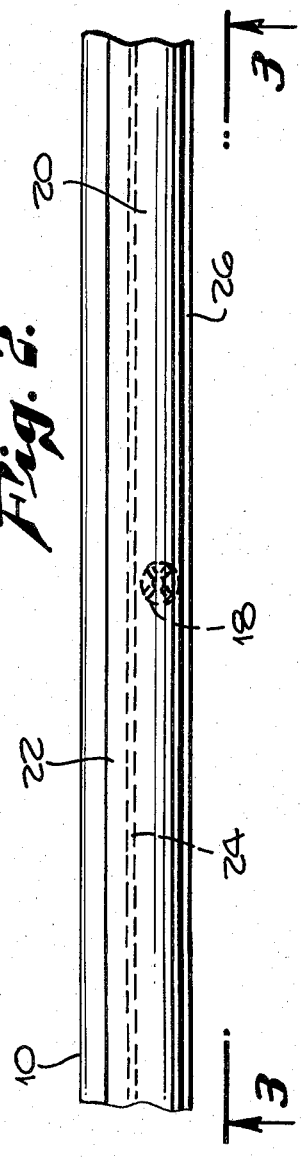
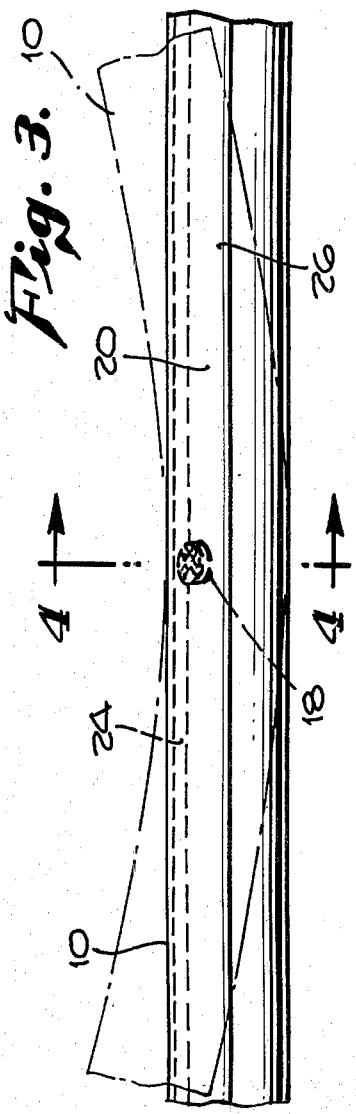
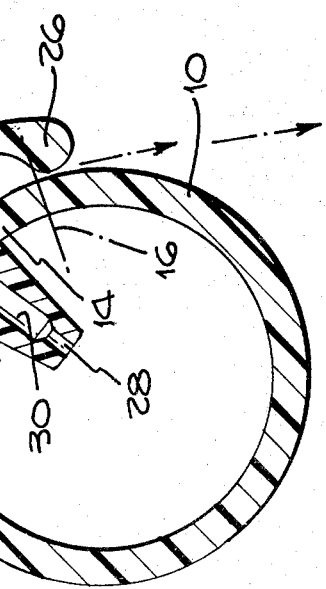

SUBSURFACE IRRIGATION

This invention relates to subsoil irrigation systems.

FIELD OF INVENTION

The invention is in the field of subsoil irrigation wherein pipes or tubing supply water to the ground below the surface thereof to prevent evaporation by the sun and wind and to place the water in the ground at precise points or along precise lines.

PRIOR ART

The prior art known at the time of the application herefor is:

| U.S. Pat. Nos. | | |
|---|---|---|
| 3,292,378 | December 20, 1966 | Rosenthal |
| 3,080,124 | March 1963 | Rathmann |
| 2,563,300 | August 1951 | Aker |
| 2,536,196 | January 1951 | MacLeod |
| 1,058,582 | April 1913 | Harris |
| 953,080 | March 1910 | Wriggins |

U.S. Pat. No. 3,292,378 was issued to the applicant herein and Robley C. Brown. It is considered the closest prior art and includes a flexible conduit with spaced flow nozzles beneath a protective flap which has one edge secured to the conduit. The present invention has improvements therein resulting from a number of years experience with the structure shown in U.S. Pat. No. 3,292,378.

DESCRIPTION

The advantages of the invention will become apparent from the following description in connection with the accompanying drawings:

FIG. 1 is a plan view of a portion of a system as it is laid out beneath the surface of the ground.

FIG. 2 is a plan view of a portion of conduit.

FIG. 3 is an enlarged detail, in plan, of a section of conduit, showing an outlet nozzle in broken lines.

FIG. 4 is an elongated cross-section taken approximately on line 4—4 of FIG. 2.

There is illustrated an elongated section of tubing 10, one end of which may be closed by a cap 12 and the other end provided with a fitting for attachment to a hose bib (not shown) or other suitable source of water under pressure. Extending longitudinally of the conduit 10 is an outlet opening band 14 whose lateral limits may be as indicated by the lines 16 in FIG. 4. Along this band, at spaced points, are outlet nozzles 18 which lie beneath a protective flap 20. The flap 20 may be formed in any suitable manner but it is preferred that the conduit 10 and flap 20 be extruded in one operation.

The flap 20 has an edge portion 22 which is secured to the conduit 10 by a radial web 24 which is adapted to extend generally vertically from the conduit when the tubing is in position in the ground to vertically support the secured edge of the flap 20. The protective flap 20 arches over the outlet opening band 14 and its opposite edge portion from the edge portion 22 terminates in a free edge having bead 26 which is disposed inwardly toward the outer surface of the conduit 10. When the conduit 10 is positioned along a straight line, the bead 26 likewise is on a straight line.

The conduit 10 and the protective flap 20 are extruded in a slight curve which is indicated by the broken lines in FIG. 2 on a rather exaggerated radius. When the conduit is viewed as in FIG. 4 the curvature would be to the right so that when the conduit is moved into a straight line position, the bead 26 on the protective flap 20 will be drawn against the outer surface of said conduit 10. The yielding bias of the bead 26 against the conduit 10 provides, in effect, a one-way valve which will permit the escape of water from the nozzles 18, past the bead 26 and into the ground. At the same time the yieldably biased bead 26 effectively prevents intrusion of foreign particles such as dirt into the area beneath the protective flap and into the nozzles.

The nozzles 18 are quite similar to those shown in my prior above-identified patent with one important exception. In FIG. 4 the nozzle is shown with a restricted inlet bore 28 and a larger bore 30 outwardly through the outer end of the nozzle. Sometimes the water used to supply the irrigation conduit 10 is not free of particulate matter and there might be a tendency for it to accumulate and plug one or more of the nozzles. However, by providing the restrictive nozzle inlet 28 and the outward more enlarged bore 30, the restriction provides high pressure rapid flow which not only tends to keep the restriction clean but also thoroughly flushes the outer larger portion of the nozzle bore.

As in my former above-identified patent the nozzles 18 are held in the tubing between shoulders 32 and the nozzle heads 34.

It should be understood that various changes can be made in the form, details, arrangement and proportions of the various parts without departing from the spirit of the invention.

What is claimed is:

1. A subsurface irrigation system comprising:
   an elongated flexible tubular conduit having a longitudinal outlet opening band,
   a protective flap extending longitudinally of said conduit and having a longitudinal edge secured to the conduit at one side of said outlet opening band,
   said flap overlying said outlet opening band,
   said flap having a free longitudinal edge opposite said secured edge and located at the other side of said outlet opening band from said secured longitudinal edge,
   and said conduit, in an unrestrained position, being curved, and when straightened, causing the free longitudinal edge of the protective flap to be biased against the conduit.

* * * * *